United States Patent [19]

Larson et al.

[11] Patent Number: 4,670,198

[45] Date of Patent: Jun. 2, 1987

[54] BINDER SYSTEM FOR THE MANUFACTURE OF NUCLEAR FUEL PELLETS, AND THE METHOD AND PRODUCT THEREOF

[75] Inventors: Richard I. Larson, Wilmington; Richard P. Ringle, Scotts Hill, both of N.C.

[73] Assignee: General Electric Company, San Jose, Calif.

[21] Appl. No.: 744,945

[22] Filed: Jun. 17, 1985

[51] Int. Cl.$^4$ .................. G21C 21/00; C01G 43/025; C09K 11/04; C04B 35/64

[52] U.S. Cl. ...................................... 264/0.5; 252/637; 252/638; 252/639; 252/643; 264/56; 264/63; 423/251; 423/252; 423/260; 423/261; 501/152

[58] Field of Search .............. 264/0.5, 56, 59, 63, 264/67, 125; 252/636, 638, 643, 639; 423/260, 251, 261, 253, 19, 252; 501/1, 80, 152, 81

[56] References Cited

U.S. PATENT DOCUMENTS

| | | | |
|---|---|---|---|
| 3,803,273 | 4/1974 | Hill et al. | 264/0.5 |
| 3,923,933 | 12/1975 | Lay | 264/0.5 |
| 3,927,154 | 12/1975 | Carter | 264/0.5 |
| 3,953,286 | 4/1976 | Watson et al. | 176/66 |
| 3,995,000 | 11/1976 | Butler et al. | 264/0.5 |
| 4,061,700 | 12/1977 | Gallivan | 264/0.5 |
| 4,138,360 | 2/1979 | Gallivan | 264/0.5 |
| 4,383,953 | 5/1983 | Larson et al. | 264/0.5 |
| 4,389,341 | 6/1983 | Gaines, Jr. et al. | 264/0.5 |
| 4,427,579 | 1/1984 | Gaines, Jr. et al. | 264/0.5 |
| 4,432,915 | 2/1984 | Gallivan | 252/638 |
| 4,522,769 | 6/1985 | Connolly, Jr. et al. | 264/0.5 |
| 4,572,810 | 2/1986 | LeBlanc, Jr. | 264/0.5 |
| 4,575,436 | 3/1986 | Larson et al. | 264/0.5 |

FOREIGN PATENT DOCUMENTS 1536677 7/1968 France .
1461263 1/1976 United Kingdom .

*Primary Examiner*—Stephen J. Lechert, Jr.
*Assistant Examiner*—Howard J. Locker
*Attorney, Agent, or Firm*—Ivor J. James, Jr.; Raymond G. Simkins

[57] ABSTRACT

A reproducible method and stable binder composition for preserving the induced plasticity of a particulate ceramic material admixture comprising uranium dioxide and a fugitive binder, and product thereof, for subsequent compaction by compressing molding in the manufacture of nuclear fuel pellets.

29 Claims, No Drawings

BINDER SYSTEM FOR THE MANUFACTURE OF NUCLEAR FUEL PELLETS, AND THE METHOD AND PRODUCT THEREOF

FIELD OF THE INVENTION

This invention relates generally to the ceramic art and the formation of sintered bodies from particulate oxide materials. It is particularly concerned with a process for producing consolidated units of particulate ceramic materials, including the compressing of such particles into coherent and handleable compacts for subsequent sintering to integrated bodies. The invention is specifically directed to the manufacture of nuclear fuel pellets or units from particulate materials containing uranium dioxide.

CROSS-REFERENCE

This invention is specifically related to the subject of fugitive binders for ceramic nuclear fuel which has been dealt with in numerous prior U.S. patents, for example, U.S. Pat. Nos. 4,061,700; 4,383,953; 4,389,341; and 4,427,579. These patents are assigned to the same assignee as this application, and are incorporated herein by reference. The disclosures of U.S. Pat. Nos. 3,803,273; 3,923,933; and 3,927,154, also assigned to the same assignee as the instant application, and relating to significant aspects in the subject field of producing nuclear fuel pellets from particulate fissionable ceramic material for reactor service, are also each incorporated herein by reference.

BACKGROUND OF THE INVENTION

Fissiddonable nuclear fuel for nuclear reactors comprises a variety of compositions and forms of fissionable materials, including ceramic compounds of uranium, plutonium and thorium. Fuel compounds for commercial power generating reactors typically comprise oxides of uranium, plutonium and thorium, and mixtures thereof. The generally most suitable and commonly used fuel for such commercial nuclear reactors is uranium dioxide. Such commercial fuel materials can be combined with minor amounts of other ingredients, including neutron flux controlling additives such as gadolinium.

Commercially produced uranium dioxide is a fine, fairly porous powder, aa form which is not suitable as such for use as fuel in commercial reactors. A number of means have been developed and used to convert powdered uranium dioxide into a form suitable for use as a fuel in power generating nuclear reactors. One commonly used technique has been to sinter appropriately sized bodies of the powdered uranium dioxide material at high temperatures to develop strong diffusion bonds between the individual power particles.

However, the sintering technique requires a preliminary compressing of the loose powder into a shaped, and self-retaining compacted body of particles of sufficient strength and integrity to survive handling and the sintering procedure. The operation of compressing fine particles into a body or coherent compact with acceptable low reject levels, and with the strength and uniformity for enduring subsequent handling and firing has been a subject of considerable concern and investigation in the nuclear fuel industry.

Conventional organic or plastic binders commonly used in powder fabrication have been considered to be unsuitable in nuclear fuel processing operations. Entrainment of any binder residues such as carbon within the sintered nuclear fuel product is unacceptable in reactor service. Moreover, the presence of any organic binder among the particles inhibits the formation during sintering of strong diffusion bonds between the particles, and adversely affects the density of the sintered product. The complete removal of binders, or their decomposition products, prior to sintering is especially difficult, and usually requires a costly additional operation in the fuel manufacture.

Accordingly, a common method has been to die press uranium dioxide powder into approximately sized "green" (unfired) compacts without the assitance of any binder. This approach however has resulted in very costly high rates of rejects and scrap material recycling because of the weakness of such green, binder-free compacts of powder.

U.S. Pat. No. 4,061,700, issued Dec. 6, 1977, to Gallivan, and assigned to the same assignee as this application, discloses a distinctive group of fugitive binders consisting of carbonate and carbamate based compositions that improved the production of sintered pellets of particulate nuclear fuel materials for nuclear reactors. The fugitive binders of this patent function without contaminating the resulting fuel product, and they permit the formation of effective bonds between sintered particles during firing without deleteriously affecting the desired porosity of the fused pellet.

The prior art techniques or means such as disclosed in U.S. Pat. No. 4,061,700, have been found wanting in some conditions and circumstances. For instance it has been observed that the fugitive binders of the aforesaid patent do not provide consistent results as to pellet strength and integrity irrespective of the blending conditions and particle characteristics of the uranium dioxide powder. Specifically the severity of agitation in blending, relative humidity and temperature, and duration of storage, as well as the uranium dioxide powder properties such as size, surface area and moisture content are all factors that apparently can detract from the uniformity of the physical attributes provided by such fugitive binders. These shortcomings are far more evident when higher rates of die pressing are applied in the compacting operation.

More effective and practical fugitive binder systems have been provided in this art for imparting improved plasticity to such particulate ceramic materials for their consolidation into coherent compacts with a minimum of rejects over a wide range of production rates, including high speed pressing with continuous rotary presses. Examples of such improved fugitive binder systems comprise the amine-type carbonate and carbamate based binders of the aforesaid U.S. Pat. No. 4,389,341 and U.S. Pat. No. 4,427,579.

However, it has been found that the improved plastic properties provided by such binder systems may not be lasting in that they exhibit a tendency to diminish over prolonged periods of time following their blending with nuclear fuel material. Thus, it is not feasible to store or retain over extended periods molding compositions comprising admixtures of particulate ceramic materials and such amine carbonate or carbamate binders. This shortcoming imposes an impediment to production scheduling and any shipping which entail prolonged periods.

Experience with the amine carbonate or carbamate-types of fugitive binder admixed with uranium dioxide-containing nuclear fuel material indicates that exposure to moisture is a likely factor in diminishing the initially effective plasticity provided by such binders. Moreover, elevated temperatures have also been found to reduce the plastic properties of these admixtures. Thus, over long periods of time, molding combinations of particulate ceramic materials containing uranium dioxide and such amines tend to lose their stability by becoming more brittle and less amenable to rapid compression molding, with the result of a high rate of rejects during compression molding. It appears that it is the presence of carbonate and carbamate ions in such binder structures that lends to unstable chemical and material processing characteristics.

SUMMARY OF THE INVENTION

This invention comprises a method of producing coherent compacts from particulate ceramic material wherein the ceramic material is consistently rendered and retained more plastic, or less brittle, for compression molding over lasting periods of time. Thus the invention entails a process comprising a combination of specified ingredients employed together, including the essential combination providing a unique carbonate-free and carbamate-free fugitive binder for the compression molding step.

OBJECTS OF THE INVENTION

It is a primary object of this invention to provide a method and fugitive binder composition for rendering particulate ceramic material uniformly more amenable to compression molding over lasting periods of time, regardless of ambient conditions, and the product thereof.

It is another object of this invention to provide means for overcoming the brittle nature of ceramic particles and to impart enduring plasticity to such materials notwithstanding exposure to changing environments over extended periods whereby it can be compression molded under essentially all compacting conditions and at high rates with a lower and feasible level of rejects for extended periods.

A further object of this invention is to provide a binder system and process for the compression molding of particulate ceramic materials comprising uranium dioxide powder into coherent compacts, and to preserve the plastic properties and molding amenability of the binder-containing ceramic material regardless of age or changing atmospheric conditions.

A still further object of this invention is to provide a uniformly reproducible method of producing nuclear fuel pellets comprising uranium dioxide from particulate ceramic material wherein a combination of the particulate ceramic and binder, and its properties are stable and can be compression molded to a coherent compact at fast rates with minimal rejects due to fractures over long periods of time following the combining of said ingredients.

Another object of this invention is to provide a fugitive binder for compression molding particulate material which is chemically stable and imparts lasting plasticity to admixtures thereof and obviates any need for die lubricants for molding.

DETAILED DESCRIPTION OF THE INVENTION

This invention comprises a method for producing a fissionable nuclear fuel product in pellet form from particulate ceramic material utilizing a unique fugitive binder system which is subsequently removed during the sintering operation. The method relates to compression molding of particulate ceramic material containing uranium dioxide powder combined with the fugitive binder composition of the invention to form coherent compacts of apt dimensions, and thereafter sintering the compacts to produce integrated bodies of fissionable nuclear fuel suitable for use in nuclear reactors.

The paticulate fissionable nuclear fuel materials for use in this invention comprise various materials used as nuclear fuels for nuclear reactors, including ceramic compounds such as oxides of uranium, plutonium and thorium. Preferred fuel compounds consist of uranium oxide, plutonium oxide, thorium oxide, the mixtures thereof.

The particulate nuclear fuel material in the practice of the invention can also include various additives such as high neutron absorbing materials comprising gadolinium to moderate neutron flux densities.

Fugitive binder systems suitable for use in the practice of this invention consist of carbonate and carbamate-free, amine-containing compounds combined with an oxalate ion source. The amine compounds consist of diamines that are soluble in water, including, for example, ethylenediamine, propylenediamine, hexamethylenediamine, trimethylenediamine, tetramethylenediamine and pentamethylenediamine, and the like water soluble diamines.

Preferred sources of the oxalate ions comprise ammonium oxalate and oxalic acid. Such oxalates are stable over temperatures ranging up to about 200° C., and any residue thereof decomposes and volatilizes above about 200° C. whereby they are aptly eliminated during sintering of the compressed compacts of fuel materials.

In this invention the above diamine compounds and source of oxalate ion are combined, then added to the particulate ceramic fuel material containing uranium dioxide. The combined binder ingredients and product thereof are then blended substantially uniformly through the particulate material. Heat is preferably applied to the blend to foster a reaction between the oxalate ions and the di-valent uranyl ions present on the surface of the uranium dioxide. The rate for this reaction is dependent upon temperature, which is preferably held at about 55° C. to about 85° C.

The ingredients and conditions of the reactions of this invention suggest that a polymeric type of binder compound and structure is produced apparently comprising:

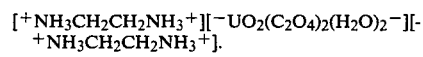

$[^+NH_3CH_2CH_2NH_3^+][^-UO_2(C_2O_4)_2(H_2O)_2^-][^+NH_3CH_2CH_2NH_3^+]$.

Ammonium oxalate, which is of low solubility in water, is added to an aqueous solution of the diamine. Hydrolysis of the diamine increases the pH of the solution which facilitates dissolution of the ammonium oxalate with evolution of ammonia gas at elevated temperatures.

Preferably a mixture of the oxalate source and the diamine is heated to 50° C. for about 2½ hours followed by 2 hours at 85° C. The low temperature heating period of less than 50° C. is to prevent excessive foaming from ammonia gas evolution. During the heating period approximately 90 percent of the ammonia content is removed. Cooling the solution an additional 3 hours reduces the ammonia content to less than 500 ppm.

Removal of ammonia from solution is desirable in the overall process, since this prevents precipitation of ammonium oxalate crystals, which subsequently act as a poreformer due to volitalization during the later sintering operation.

The combined diamine and oxalate ingredients, or products thereof, are added to the particulate ceramic nuclear fuel material comprising uranium dioxide to thereby form a stable uranyl oxalate. The combined and interacted ingredients including the formed binder composition are thereafter dried to remove excessive moisture by any suitable means such as the application of heated nitrogen gas moderately increased in temperature up to about 150° C.

It is during this drying process that any ammonium oxalate, if present, precipitates from solution and subsequently acts as a poreformer to produce low sinter density fuel.

This unique carbonate and carbamate-free binder system imparts a high degree of plasticity, has been found to be stable and resistant to reaction with water and carbon dioxide, and in turn deterioration. Moreover it has also been found to be stable at relatively elevated temperatures of up to about 85° C., over extended periods. At higher temperatures of about 200° C. it partly decomposes for its effective elimination in the subsequent sintering step. Accordingly, the unique binder system of this invention is not degraded when blends thereof with particulate nuclear fuel material are stored or otherwise retained for long periods of time, even under adverse conditions of high humidity and high temperature.

Proportions of such binder forming ingredients for the compositions of this invention preferably comprise the use of a diamine compound identified above in amounts of from about 1% to about 3% by weight based upon the weight of the nuclear fuel material. The oxalate ion source is included in amounts of from about 0.5% to about 1.5% by weight of the nuclear fuel material. Typically the diamine aqueous solution/oxalate ion source combination will comprise about 30 to about 50 (preferably about 40) percent by weight of the diamine with about 25 to about 60 (preferably about 40) percent by weight of water and about 10 to about 25 (preferably about 20) percent by weight of the oxalate ions. This combination is added to the particulate nuclear fuel material in amount of about 2 percent to about 6 percent, by weight thereof. Quantities of such binder ingredients in excess of the above upper amounts generally do not provide a proportionally commensurate benefit in bonding capacity, and may introduce unwanted effects that compromise any advantages or the costs of including greater amounts of these ingredients.

As noted hereinabove, the diamine compound is dissolved in water to facilitate the action of the less soluble ammonium oxalate in the system. Diamine water solutions of any practical concentration for achieving the interaction and addition to the particulate ceramic nuclear fuel can be employed. Nevertheless, excesses of water which must be removed later in the operation are not expedient. However, diamine compound water solutions of, for example, about 30% to about 40% solids added initially are generally appropriate. Excessive water is removed following the addition to the particulate nuclear fuel material and the reaction period. Suitable means for water removal comprise passing nitrogen gas at a temperature of up to about 150° C. through the particulate mixture of such ingredients and their reaction product for a typical period of about 20 to about 60 minutes, or longer if appropriate.

A binder system prepared with the diamine solution and oxalate in accordance with this invention is blended uniformly with the particulate ceramic nuclear fuel material containing uranium dioxide, and the resultant mixture can thereafter be compressed into a coherent compact of suitable dimensions pursuant to the procedures and means of the art. The method of this invention is reproducible and imparts a high degree of plasticity to the particulate ceramic. Moreover it enables the prompt use, or long delayed use, such as resulting from extended storage or shipment, of the blend of fugitive binder and particulate fuel material for compressing into compacts. Also, the lasting plasticity attributable to the invention is adequate for the effective use of the blends in high speed, continuous production rotary press devices and operations for long periods after preparing the blend to provide unfired coherent compacts. Further, with this binder system, a die lubricant is not needed in the pressing operation.

The "green" (unfired) coherent compacts thus formed are then sintered in accordance with the practices and procedures of the art to expel binder material and then integrate the ceramic particles into a uniform and continuous body. The sintered product, typically in the form of a cylindrical pellet, is thereafter ground to specified dimension for its designated service.

Blending of the added binder can be effected with any appropriate "dry" mixing apparatus including low shear blenders such as fluidized bed, slab and ribbon blenders, and high shear or intensive blenders such as vibratory mills, ball mills and centrifugal mills.

A preferred blending apparatus comprises vibratory mills of the type described in pages 8–29 to 8–30 of Perry and Chilton's 5th edition of *Chemical Engineering Handbook*, McGraw-Hill Book Co.

Examples of a preferred procedure for the practice of this invention, and of the fugitive binders thereof, are as follows:

Several examples of the binder system of this invention, comprising the following formulations, were prepared as follows. Oxalic acid or ammonium oxalate were combined with a solution of ethylenediamine to give the following concentrations after ammonia removal.

| Example | pH | Density | % EDA | % Oxalate | % Water | % Ammonia | % CO$_2$ |
|---|---|---|---|---|---|---|---|
| 1 | 11.30 | 1.126 | 38.8 | 16.0 | 45.2 | 0.086 | 0.47 |
| 2 | 11.39 | 1.122 | 40.7 | 16.0 | 43.3 | 0.045 | 0.55 |
| 3 | 11.36 | 1.121 | 42.8 | 17.7 | 39.5 | 0.053 | 0.67 |
| 4 | 11.47 | 1.118 | 42.7 | 16.5 | 40.8 | 0.066 | 0.55 |

% Ammonia - Close to Limit of Detection or 0.02%
% CO$_2$ - Close to Limit of Detection or 0.5%

Each sample batch was approximately 15 gallons in volume which provides 8 to 9 small batches of binder solution for each production blend of uranium dioxide powder.

The ethylenediamine and oxalate ion binder solution was added to discrete 180 kg batches of uranium dioxide powder fuel material and blended thoroughly. During the blending process the binder and the fuel were heated to about 55°–75° C. to foster the reaction of the binder ingredients with the di-valent uranyl ions present on the surface of the uranium dioxide particles. Approximately 10,000 kgs of the blended uranium dioxide powder fuel were compressed into compacts for evaluation.

Fuel pellets comprising sintered compacts of the uranium dioxide powder blended with the ethylenediamine and oxalate ion binder system of the above examples were ground to size and the reject rate due to a defective or weak structure was determined. The overall yield of acceptable pellets is shown below:

| Ethylenediamine-Uranyl-Oxalate Binder Process | |
| --- | --- |
| Grinder Yield, % Hydramet Press | Grinder Yield, % Rotary Press |
| 97.2 | 96.1 |
| 97.8 | 94.3 |
| 97.2 | 96.2 |
| 96.8 | 95.6 |
| 97.2 | 95.2 |
|  | 96.5 |
|  | 96.1 |

For comparison, fuel pellets produced in the same manner with the carbamate-carbonate containing binder of the same assignee's application for patent Ser. No. 517,588 filed July 27, 1983, (abandoned) had the following acceptance rate when ground under the same conditions.

| Uranyl Oxalate Carbonate Binder Process Rotary Press Grinder Yield, % |
| --- |
| 25.5 |
| 80.6 |
| 62.3 |

The components of each category of these two distinctive type of binder systems are also given below for comparison.

| Comparison of Uranyl Oxalate Carbonate Binder And Ethylenediamine Uranyl Oxalate Binder | | | | |
| --- | --- | --- | --- | --- |
| Uranyl Oxalate Carbonate Binder | | | | |
| (2) % $CO_2$ | (1) % Oxalate | % $NH_3$ | $H_2O$, ppm | |
| 0.27 | 0.82 | 0.32 | 2596.00 | |
| 0.26 | 0.90 | 0.35 | 2629.00 | |
| 0.28 | 0.91 | 0.35 | 2873.00 | |
| Ethylenediamine Uranyl Oxalate Binder | | | | |
| % $CO_2$ | (3) % Oxalate | % $NH_3$ | $H_2O$, ppm | % EDA |
| LT-LD | 0.36 | LT-LDD | 3349.00 | 0.91 |
| LT-LD | 0.37 | LT-LDD | 3394.00 | 0.94 |
| LT-LD | 0.39 | LT-LDD | 3654.00 | 0.98 |

(1) Primarily Particulate AO
(2) % $CO_2$ either in the form of Carbamate of Carbonate
(3) Oxalate not in particulate form
LT = Less than
LD = Limit of detection = 0.100%
LDD = Limit of detection = 0.05%

The absence of ammonia in the final binder structure of the uranyl oxalate binder indicates particulate ammonia oxalate is not present. On the other hand, chemical analysis of powder containing the uranyl oxalate carbonate binder shows the presence of ammonia. Thus, the oxalate ion in the latter case is acting as a pore-former and not a binder.

Carbamate and carbonate ions are not present in the uranyl oxalate binder as indicated by the lack of $CO_2$. (See the above chemical analysis). Equilibrium with atmospheric $CO_2$ after or during processing is not a problem with the uranyl oxalate binder. The presence of $CO_2$ in powder containing the uranyl oxalate carbonate binder indicates that equilibrium with atmospheric $CO_2$ can produce differences in material properties.

The above indicates how the uranyl oxalate is chemically and physically a more stable binder structure.

What is claimed is:

1. A method of producing durable coherent compacts of particulate ceramic nuclear fuel which imparts lasting plasticity to the particulate ceramic material, consisting essentially of the steps of:
   a. providing an aqueous solution of a diamine and adding a source of oxalate ions to said diamine aqueous solution whereby the high pH of the solution due to hydrolysis of the diamine dissolves the source of oxalate ions, then adding said aqueous solution of diamine and dissolved oxalate ions to particulate nuclear fuel material comprising uranium dioxide, and blending the solution containing diamine and oxalate ions therethrough to produce a fugitive binder for said fuel material; and
   b. pressing the resultant blend comprising particulate fuel material and diamine with oxalate ions into a coherent compact.

2. The method of claim 1, wherein the aqueous solution of diamine and source of oxalate ions is heated before adding to the particulate nuclear fuel.

3. The method of claim 1, wherein the diamine comprises ethylenediamine.

4. The method of claim 1, wherein the oxalate ions are provided by ammonium oxalate or oxalic acid.

5. A method of producing durable coherent compacts of particulate ceramic nuclear fuel which imparts lasting plasticity to the particulate ceramic material, consisting essentially of the steps of:
   a. providing an aqueous solution of a diamine and adding a source of oxalate ions derived from at least one source selected from the group consisting of oxalic acid and ammonium oxalate to said diamine aqueous solution whereby the high pH of the solution due to hydrolysis of the diamine dissolves the source of oxalate ions, then adding said aqueous solution of diamine and dissolved oxalate ion source to particulate nuclear fuel material comprising uranium dioxide and blending the solution containing diamine and oxalate ions therethrough to produce a fugitive binder for said fuel material; and
   b. pressing the resultant blend comprising particulate fuel material and diamine and oxalate ions into a coherent compact.

6. The method of claim 5, wherein the diamine is selected from the group consisting of ethylenediamine, propylenediamine and hexamethylenediamine.

7. The method of claim 5, wherein the oxalate ions are derived from ammonium oxalate.

8. The method of claim 5, wherein the added fugitive binder forming ingredients comprise the combination of about 30% to about 50% by weight of diamine with about 25% to about 60% by weight of water and about 10% to about 25% by weight of oxalate ions.

9. The method of claim 5, wherein the diamine solution and oxalate ion ingredients for producing the binder are combined and added to the particulate nuclear fuel material in amount of about 2% to about 6% by weight thereof.

10. A method of producing durable coherent compacts of particulate ceramic nuclear fuel which imparts lasting plasticity to the particulate ceramic material for extended processing, consisting essentially of the steps of:

a. providing an aqueous solution of ethylenediamine and adding a source of oxalate ions to said ethylenediamine aqueous solution whereby the high pH of the solution due to hydrolysis of the ethylenediamine dissolves the source of oxalate ions, then adding said aqueous solution of ethylenediamine and dissolved oxalate ions to particulate nuclear fuel material comprising uranium dioxide and blending the solution containing ethylenediamine and oxalate ions therethrough; and b. pressing the resultant blend comprising particulate fuel material and ethylenediamine and oxalate ions into a coherent compact.

11. The method of claim 10, wherein the ethylenediamine is in aqueous solution and ammonium oxalate powder is added as a powdered solid, and ammonia is removed in situ to form the binder solution without ammonium oxalate precipitation.

12. The method of claim 10, wherein the ethylenediamine is in aqueous solution and ammonium oxalate powder is dispersed in said aqueous solution of ethylenediamine before adding to the particulate nuclear fuel material, and ammonia is removed in situ to form the binder solution and to prevent ammonium oxalate precipitation.

13. The method of claim 10, wherein the added fugitive binder forming ingredients comprises a combination of about 1% to about 3% by weight of ethylenediamine and about 0.5% to about 1.5% by weight of ammonium oxalate based upon the weight of the particulate nuclear fuel material.

14. The method of claim 10, wherein the fugitive binder comprises a combination of about 1.5% of weight of ethylenediamine and about 0.8% by weight of ammonium oxalate based upon the weight of the particulate nuclear fuel material.

15. A method of producing durable coherent compacts of particulate ceramic nuclear fuel which imparts lasting plasticity to the particulate ceramic material for extending processing, consisting essentially of the steps of:

a. preparing a fugitive binder comprising a combination of a diamine and oxalate ions for particulate nuclear fuel material by providing an admixture of oxalate ions in an aqueous solution of ethylenediamine, in approximate ratios of about one part by weight of the oxalate ions to about two parts by weight of the ethylenediamine dissolved in approximately and equal part by weight of water, and adding said combined ingredients to particulate ceramic nuclear fuel containing uranium dioxide; and b. blending said added admixture of ingredients with the particulate nuclear fuel containing uranium dioxide at a temperature of greater than 55° C. to interact the ingredient and produce a binder for said particulate nuclear fuel.

16. The method of claim 15, wherein the blend of particulate nuclear fuel material comprising uranium dioxide and admixture of oxalate ions in an aqueous solution of ethylenediamine is compressed into a coherent compact.

17. A compression moldable particulate mixture containing particulate ceramic nuclear fuel material, consisting essentially of the combination of particulate ceramic nuclear fuel material including uranium dioxide and a fugitive binder forming admixture of oxalate ions dissolved in a diamine aqueous solution with the ceramic nuclear fuel material containing uranium dioxide.

18. The compression moldable particulate mixture of claim 17, which has been compressed into coherent compacts.

19. The compression moldable particulate mixture of claim 17, wherein the diamine is selected from at least one diamine from the group consisting of ethylenediamine, propylenediamine, and hexamethylenediamine.

20. A compression moldable particulate mixture containing particulate ceramic nuclear fuel material, consisting essentially of the combination of particulate ceramic nuclear fuel material including uranium dioxide and a fugitive binder forming admixture of oxalate ions dissolved in an ethylenediamine aqueous solution with the uranium dioxide.

21. The compression moldable particulate material of claim 20, wherein the fugitive binder forming ingredients of the admixture comprise about 0.2% to about 0.5% by weight of oxalate ions with about 0.8% to about 3% by weight of ethylenediamine, based upon the weight of the particulate ceramic nuclear fuel material.

22. A method of producing durable coherent compacts of particulate ceramic nuclear fuel which imparts lasting plasticity to the particulate ceramic material for extending processing, consisting essentially of the steps of:

a. preparing a fugitive binder for particulate nuclear fuel material by adding ammonium oxalate to an aqueous solution of ethylenediamine and dissolving the ammonium oxalate therein providing oxalate ions, in approximate ratios of about one part by weight of the oxalate ion to about two parts by weight of the ethylenediamine, and adding said combined ingredients of solution of ethylenediamine with oxalate ions to particulate ceramic nuclear fuel containing uranium dioxide;

b. blending said combined ingredients comprising ethylenediamine solution with oxalate ions with the particulate nuclear fuel at a temperature of at least about 55° C. to interact the ethylenediamine and oxalate ions with uranium dioxide and produce a binder for said particulate nuclear fuel; and c. drying the combined and interacted ingredients and removing water from the combined mass by applying a heated gas the temperature of which is not greater than about 150° C.

23. A method of producing coherent compacts of particulate ceramic nuclear fuel which imparts lasting plasticity to the particulate ceramic material for extended processing, consisting essentially of the steps of:

a. providing a fugitive binder comprising a uranyl oxalate reaction product of a combination of diamine and oxalate ions admixed with uranium dioxide and having the composition of

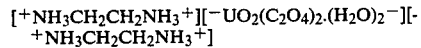

for particulate nuclear fuel material containing uranium dioxide, and blending same; and b. pressing the resultant blend comprising particulate fuel material and binder into a coherent compact.

24. The method of claim 23, wherein the uranyl oxalate reaction product of

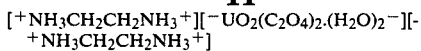

is prepared by combining the diamine in water solution with oxalate ions and then adding said combined ingredients to the particulate nuclear fuel material containing uranium dioxide.

25. The method of claim 23, wherein the uranyl oxalate reaction product of

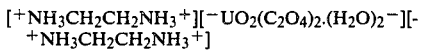

is prepared by combining the diamine and oxalate ions and adding said combined ingredients to the particulate nuclear fuel material containing uranium dioxide in an amount of about 2% to about 6%, by weight of the nuclear fuel material.

26. A method of producing coherent compacts of particulate ceramic nuclear fuel which imparts lasting plasticity to the particulate ceramic material for extended processing, consisting essentially of the steps of:
 a. providing a fugitive binder comprising uranyl oxalate reaction product of a combination of at least one diamine selected from the group consisting of ethylenediamine, propylenediamine and hexamethylenediamine and oxalate ions added to uranium dioxide for particulate nuclear fuel material containing uranium dioxide, and blending same through the particulate nuclear fuel material; and
 b. pressing the resultant blend comprising particulate fuel material and the binder reaction product into a coherent compact.

27. The method of claim 26, wherein the uranyl oxalate reaction product is prepared by combining the diamine in a water solution and oxalate ions in proportions by weight of about 30% to about 50% diamine, in about 25% to about 50% water with about 10% to about 25% oxalate ions.

28. The method of claim 26, wherein the combined solution of the diamine and oxalate ions is added to the particulate nuclear fuel material containing uranium dioxide in amount of about 2% to about 4% by weight of the fuel material.

29. The method in claim 26, wherein the diamine is ethylenediamine in aqueous solution.

* * * * *